via) United States Patent
Heath et al.

(10) Patent No.: US 8,067,738 B1
(45) Date of Patent: Nov. 29, 2011

(54) SPACE BASED CALIBRATION TRANSFER SPECTRORADIOMETER

(75) Inventors: Donald Frederick Heath, Boulder, CO (US); Richard Wayne Tarde, Louisville, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 170 days.

(21) Appl. No.: 12/547,165

(22) Filed: Aug. 25, 2009

(51) Int. Cl.
G01J 5/00 (2006.01)
(52) U.S. Cl. .................................................. 250/338.1
(58) Field of Classification Search .... 250/338.1–338.5, 250/330–335, 336.1–336.2, 337, 339.01–339.15, 250/340, 341.1–341.8
See application file for complete search history.

(56) References Cited

U.S. PATENT DOCUMENTS

| | | | |
|---|---|---|---|
| 4,910,409 A | 3/1990 | Hoffman et al. | |
| 5,204,733 A | 4/1993 | Deshayes | |
| 5,218,416 A | 6/1993 | Haring et al. | |
| 5,302,823 A * | 4/1994 | Franklin et al. | 250/252.1 |
| 5,325,171 A | 6/1994 | Shimizu | |
| 5,659,168 A | 8/1997 | Dey et al. | |
| 5,672,866 A | 9/1997 | Messina | |
| 5,835,267 A | 11/1998 | Mason et al. | |
| 6,005,249 A | 12/1999 | Hayes, Jr. et al. | |
| 6,111,640 A | 8/2000 | Hedman et al. | |
| 6,294,785 B1 | 9/2001 | Gordley | |
| 6,417,500 B1 | 7/2002 | Wood | |
| 6,455,830 B1 | 9/2002 | Whalen et al. | |
| 6,583,424 B2 | 6/2003 | Staton et al. | |
| 6,597,457 B1 | 7/2003 | Silverglate et al. | |
| 6,924,169 B2 * | 8/2005 | Moon et al. | 438/73 |
| 7,166,825 B1 | 1/2007 | Smith et al. | |
| 7,482,572 B1 | 1/2009 | Galvin | |

OTHER PUBLICATIONS

Bordi et al., "Overview on advance in radiometric receivers design and technology: application to MIMR," 1994, SPIE Proceedings, vol. 2313, pp. 174-185.*
G. Matthews, "Celestial body irradiance determination from an underfilled satellite radiometer: application to albedo and thermal emission measurements of the Moon using CERES," Sep. 2008, Applied Optics, vol. 47, No. 27, pp. 4981-4993.*
Lee et al., "The clouds and the Earth's radiant energy system (CERES) experiment, Earth observing system (EOS) instrument and calibrations," 1993, SPIE Proceedings, vol. 1939, pp. 61-71.*
Bremer et al., "Concept for a full-EArth albedo radiometer on a GEOES satellite", 2004, SPIE Proceedings, vol. 5542, pp. 236-247.*
Stockton et al., "Parabola II: A field sphere-scanning radiometer for radiance measurements of sky and ground," 1994, SPIE Proceedings, vol. 2270, pp. 115-122.*
Ruckstuhl et al., "TURAC-A new instrument package for radiation budget measurements and cloud detection," 2005, American Meteological Society, pp. 1473-1479.*

(Continued)

*Primary Examiner* — Kiho Kim
(74) *Attorney, Agent, or Firm* — Sheridan Ross P.C.

(57) ABSTRACT

A Space-based Calibration Transfer Spectroradiometer (SCATS) instrument that establishes a maintainable SI traceable radiometric calibration on-orbit with long-term stability accuracy, such as is required for long term climate monitoring missions, is provided. The SCATS instrument includes sensors that directly measure the highly stable solar irradiance and/or the lunar irradiance, and the Earth radiance through an invariant instrumental optical path. This common path measurement concept eliminates uncertainties associated with the calibration and degradation of intervening solar attenuation elements that represent the current state of the art. The SCATS instrument can be used to calibration of hyperspectral and multi-spectral sensors operating from the ultra-violet to long wave infrared. A suitable selection of detectors and filters enables this wide wavelength application.

7 Claims, 6 Drawing Sheets

OTHER PUBLICATIONS

Martin et al., "Ion-beam-assisted deposition of thin films", Applied Optics, vol. 22, No. 1, Jan. 1, 1983, 7 pages.

Saunders et al., "Automated radiometric linearity tester", Applied Optics, vol. 23, No. 20, Oct. 15, 1984, 3 pages.

Slater et al., "Solar-diffuser panel and ratioing radiometer approach to satellite sensor on-board calibration", Calibration of Passive Remote Observing Optical and Microwave Instrumentation, SPIE vol. 1493, 1991, 6 pages.

Palmer et al., "A ratioing radiometer for use with a solar diffuser", Calibration of Passive Remote Observing Optical and Microwave Instrumentation, SPIE vol. 1493, 1991, 12 pages.

Biggar et al., "Solar-radiation based calibration in the range 740 to 2400nm", EURPTO Conference on Sensors, Systems, and Next-Generation Satellites V, SPIE vol. 3870, Sep. 1999, 6 pages.

Krause et al., "On-orbit radiometric calibration using a solar diffuser", Earth Observing Systems VI, SPIE vol. 4483, 2002, 11 pages.

Yoon et al., "Linearity of InGaAs photodiodes", Institute of Physics Publishing, Metrologia, Feb. 7, 2003, 5 pages.

Durak et al., "Optical characterization of the silicon photodiodes for the establishment of national radiometric standards", Optics and Laser Technology, 2004, 5 pages.

Panfilov et al., "Precision radiometric calibration of space-borne instruments in the spectral region from UV through FIR based on the use of fixed-point blackbodies", The All-Russian Research Institute for Opto-Physical Measurements, 2005, 4 pages.

Stone et al., "Use of the Moon to support on-orbit sensor calibration for climate change measurements", Earth Observing Systems XI, SPIE vol. 6296, 2006, 9 pages.

Wang et al., "Assessing NOAA-16 HIRS Radiance Accuracy Using Simultaneous Nadir Overpass Observations from AIRS", Journal of Atmospheric and Oceanic Technology, vol. 24, Jan. 12, 2007, 16 pages.

Revercomb et al., "Advanced On-orbit Blackbodies—Paving the Way for CLARREO", NASA CLARREO Workshop, Jul. 17-19, 2007, 34 pages.

Franz et al., "Sensor-independent approach to the vicarious calibration of satellite ocean color radiometry", Applied Optics, vol. 46, No. 22, Aug. 1, 2007, 15 pages.

Thompson et al., "Beamcon III, a Linearity Measurement Instrument for Optical Detectors", Journal of Research of the National Institute of Standards and Technology, vol. 99, No. 6, Nov.-Dec. 1994, 6 pages.

Takashashi, "Temperature stability of thin-film narrow-bandpass filters produced by ion-assisted deposition", Applied Optics, vol. 34, No. 4, Feb. 1, 1995, 9 pages.

Kopp et al., "Short-Wave Instrument Development for CLARREO", Optical Society of America, 2009, 1 page.

Cao et al., "Assessing the consistency of AVHRR and MODIS L1B reflectance for generating Fundamental Climate Data Records", Journal of Geophysical Research, vol. 113, 2008, 10 pages.

Butler et al., "Chapter 10. The Calibration and Characterization of Earth Remote Sensing and Environmental Monitoring Instruments", The Practice of Optical Radiometry, Feb. 21, 2005, 72 pages.

Brown et al., "NIST facility for Spectral Irradiance and Radiance Responsivity Calibrations with Uniform Sources", Metrologia, 2000, 4 pages.

* cited by examiner

SPACE BASED CALIBRATION TRANSFER SPECTRORADIOMETER

FIELD

Calibration transfer spectroradiometer instruments and methods are provided.

BACKGROUND

Quantifying the changes in the Earth's climate and determining if the changes result from natural variability or have an anthropogenic origin are fundamental to scientific and public policy. The climate change variables of interest are derivable from passive space-borne measurements in the wavelength range from the ultraviolet into the thermal infrared. These atmospheric variables include temperature profiles, water vapor, ozone, aerosols, precipitation, $CO_2$ and other greenhouse gases; surface variables include vegetation, snow cover, sea ice, sea surface temperature, and ocean color. Solar spectral and total solar irradiance measurements are required to retrieve the needed climate parameters. These measurements contribute to the Earth radiation budget, the accounting of the incoming solar radiation, the re-radiated portion, and the trapped fraction responsible for climate change. Currently on-orbit instrumental uncertainties are comparable to or substantially greater than the desired climate change geophysical signals, and they occur on time scales that are at the operational lifetime of typical satellite systems that perform the essential measurements. Stable long term on-orbit calibration is needed for these measurements to separate physical process related signals from those that are instrumental in origin. Climatologists recognizing this have called for space based calibration traceable to the International System of Units (SI) with an accuracy that assures the fidelity of long term trending between generations of sensors.

Historically, reflective or transmissive solar diffusers have been used for top of the atmosphere calibration of atmospheric radiances. Solar radiation scatters from a diffuser into the entrance aperture of the remote sensing instrument to be calibrated. The diffuser transforms the solar irradiance into a top of the atmosphere radiance source that is used to calibrate Earth spectral radiance measurements. Use of a NIST standard of spectral irradiance combined with an accurate measurement of the diffuser bidirectional reflection distribution function (BRDF) calibration allows the accurate calibration of the sensor. This approach has long been the accepted method for calibrating atmospheric and surface radiance sensors. However, this methodology has been plagued by unaccountable changes in the diffuser properties. Therefore, by itself the diffuser technique does not provide the long term stability needed for climate trending on-orbit.

Several techniques have been proposed, explored, and implemented on-orbit to overcome the diffuser problem. For example, terrestrial radiance measurements from high spectral and high spatial resolution imaging instruments have been referenced to lunar irradiance measurements for determining the long term effects of on-orbit instrument degradation. Using lunar irradiance for on-orbit calibration has proven to be insufficient for climate change detection. In particular, the lunar spectral radiance is rapidly changing and non-uniform; however the lunar spectral irradiance is described by the Robotic Lunar Observatory (ROLO) model as a function of lunar phase angle that has a relative uncertainty of approximately 1.0%. The problem of variable radiance is compounded by detector spatial non-uniformity coupled with a wavelength-dependent responsivity; consequently, high spatial resolution instruments require an integration of the Lunar spectral radiance. The absolute albedo of the Moon is known with an uncertainty of about 5%. This limits its usefulness as an absolute spectral albedo standard in space; however, it is an excellent relative spectral albedo reference in space. Through modeling and measurement this uncertainty can be reduced and inter-calibration of satellite sensors will benefit. Vicarious calibration offers another approach to long-term calibration stability. Using the vicarious calibration approach, ground truth measurements of selected terrestrial areas exhibiting a high degree of spatial and spectral uniformity are periodically measured as spectral radiance targets for high spatial resolution instruments in space. The uncertainties of this technique limit its accuracy to roughly 3%. A third method, simultaneous nadir overpass (SNO) for inter-satellite calibration has been developed and applied to sensor calibration. A relative calibration accuracy of 2 to 3% has been achieved between instruments. There are plans to support other instruments with the SNO technique.

Signal attenuation methods have been used to observe and quantify the total solar irradiance. In signal attenuation approaches, calibrated apertures and beam attenuating filters are inserted into the optical path to attenuate the solar signal. In this spirit, a spectrometer using precision apertures, optical attenuators, and variable integration times to measure the solar irradiance while directly viewing the Sun is being developed. The apertures and attenuators from the beam path are removed and the integration time is changed to view the Earth. The solar and Earth views do not have a common instrumental optical path. When the solar and Earth measurements are divided, common path uncertainties propagate. This variable optical path method suffers from the unavoidable uncertainties associated with each signal attenuation step.

While various approaches have been proposed or deployed, stable on-orbit calibration that assures high confidence in detecting changes in climate related variables remains unrealized.

SUMMARY

The present invention provides space-based calibration transfer spectroradiometer (SCATS) methods and devices that achieve on-orbit radiometric SI based traceability using the Sun's irradiance as a stable calibration source. The initial SCATS spectral radiance and irradiance SI traceable calibrations can be performed at the NIST SIRCUS Facility. The ratio of the spectral radiance to the spectral irradiance calibration coefficients, i.e., the spectral albedo calibration coefficients, are SI traceable, and they are invariant on the ground and on-orbit due to the unique SCATS optical design. The instrument optical path provided by embodiments of the present invention when viewing the Sun (or Moon) and Earth is the same. That is, optical elements featured in conventional methods and devices that attenuate or diffuse the solar flux when viewing the Sun and are removed from the optical path when viewing the Earth are not used in embodiments of the present invention. Measurement parameters are selected to optimize the signal to noise ratio of the solar irradiance, lunar irradiance, and Earth radiance measurements. The invariant SCATS albedo calibration coefficients are used to derive the spectral albedo of the Earth relative to the solar and lunar spectral irradiances.

In accordance with further embodiments of the present invention, a multi-channel spectroradiometer is provided. Each channel can include a field limiting baffle, a spectral defining filter, a wavelength band optimized detector, and supporting electronics. The integrated multi-channel sensor is mounted to a single axis scan mechanism that provides a means for obtaining the necessary views to the Sun, Moon, and Earth. This invariant optical path design provides stable long term calibration for satellite based radiometric sensors. As a result, uncertainties associated with the calibration and on-orbit degradation of temporary in-line optical elements are avoided. This hardware and methodology provides high on-orbit calibration accuracy and long term stability for on-orbit albedo measurements and for calibration of co-manifested sensors. It also provides small cross calibration uncertainties for independently orbiting sensors when the simultaneous nadir overpass technique or lunar irradiance observations are used to transfer the calibration from SCATS to other sensors.

Methods in accordance with embodiments of the present invention include the capabilities to execute a cross track spatial scan of earth radiances, and to measure solar spectral irradiances and lunar spectral irradiances periodically, for example as frequently as once for the Sun and for the Moon during lunar phases between the $1^{st}$ and $3^{rd}$ quarters by rotating the SCATS' scan head to an angle where the solar or lunar vectors are aligned in the plane with the optical axes of the SCATS' sensors. The orbital motion of the SCATS instrument provides a solar or lunar scan through the instantaneous field of view (IFOV) of the SCATS. The solar and lunar scans can be adjusted to be limited to a small angular range about the optical axes of the SCATS sensors or the scan can be expanded to map out the baffle angular response function. After performing a solar or lunar series of measurements the SCATS instrument can be positioned in a nadir viewing mode for a series of Simultaneous Nadir Overpass (SNO) observations for a co-located instrument on the same space platform or for albedo comparison measurements with an instrument operating from a different space platform. The spectral calibration of SNO comparisons are the SI traceable spectral albedoes relative to the Sun or the Moon.

Additional features and advantages of the present invention will become more readily apparent from the following detailed description, particularly when taken together with the accompanying drawings.

DETAILED DESCRIPTION

Figure 1A:
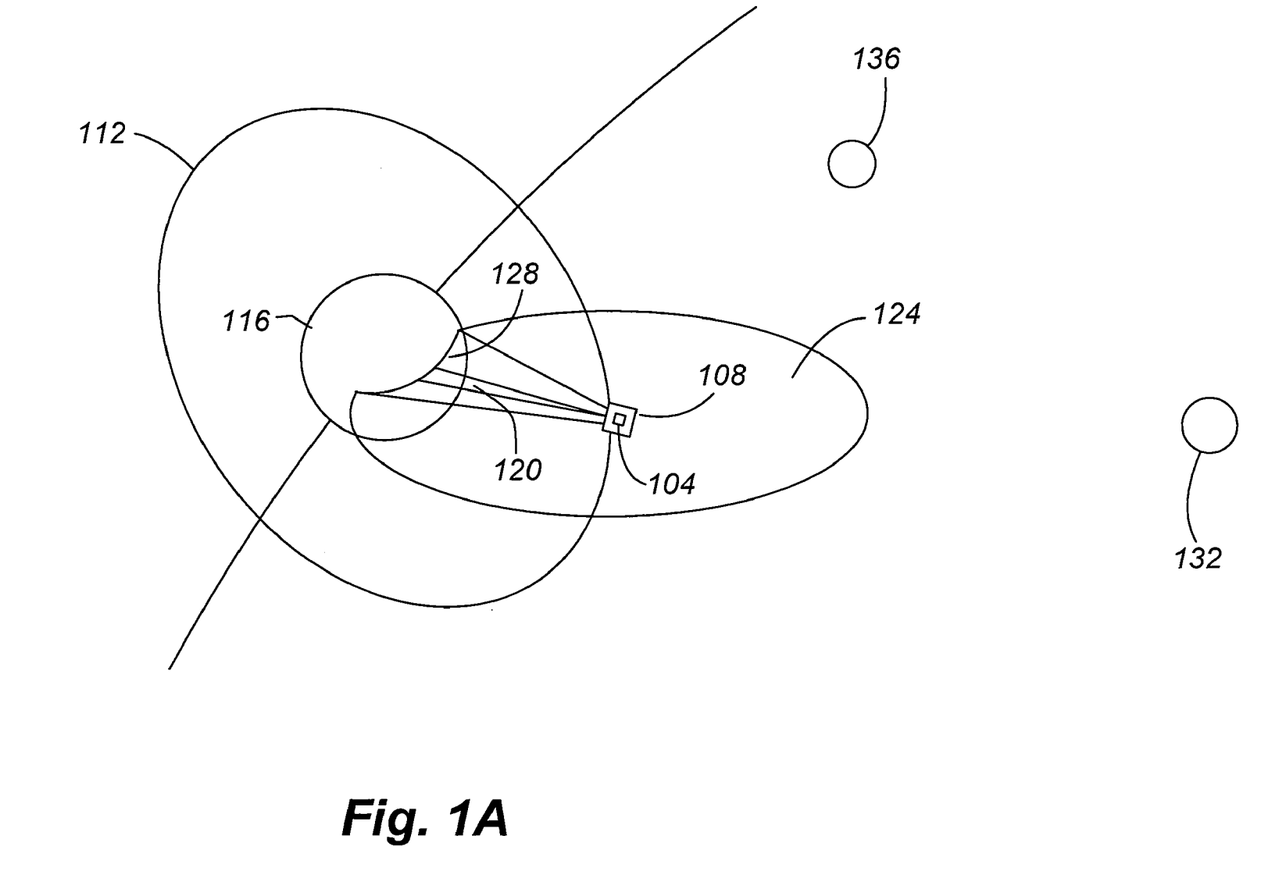
FIGS. 1A and 1B illustrate a SCATS instrument in accordance with embodiments of the present invention in orbit about the Earth.
Figure 1B:
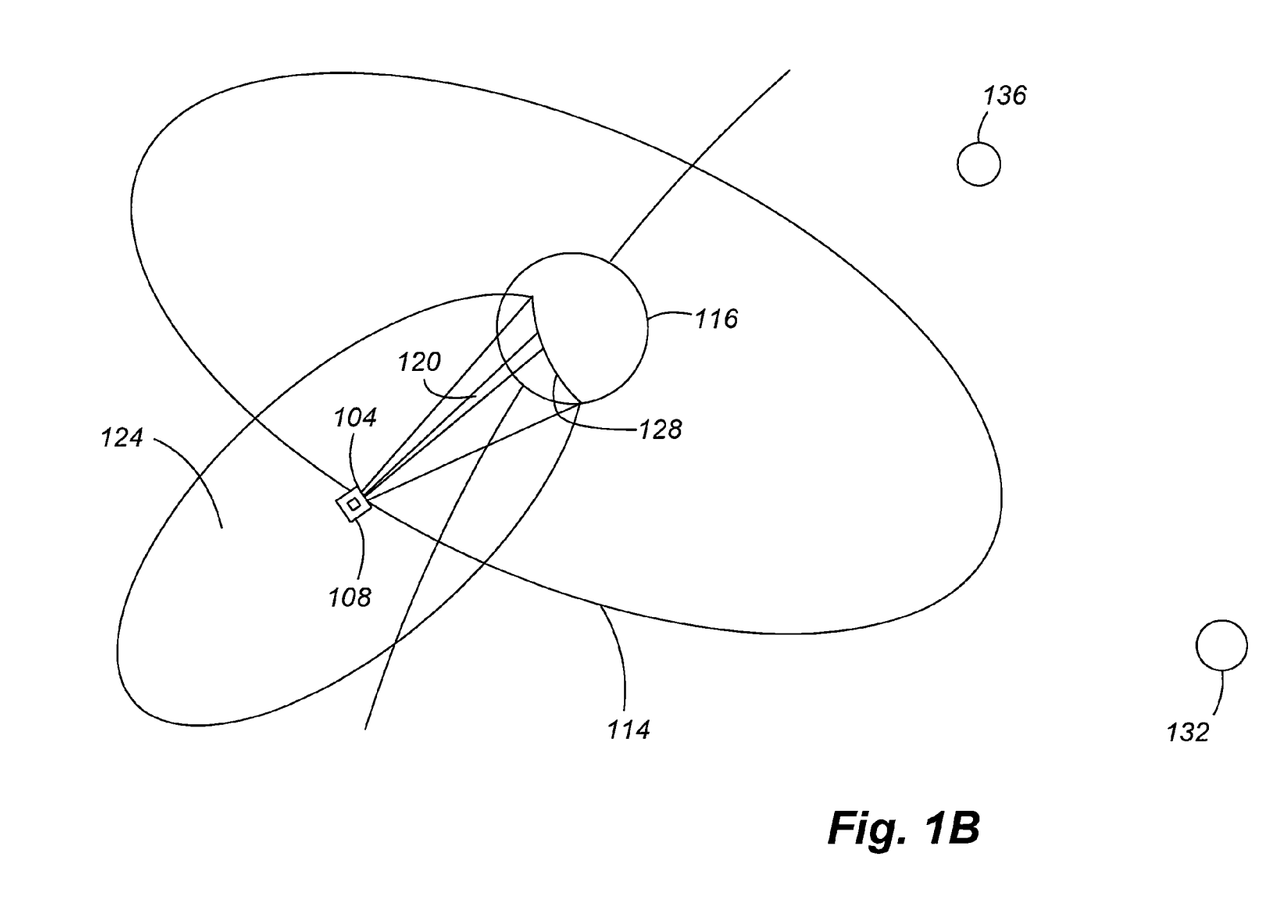

FIGS. 1A and 1B depict a space based calibration transfer spectroradiometer (SCATS) instrument 104 provided as part of or mounted to a satellite 108. As shown, the SCATS instrument 104 and associated satellite 108 are in orbit 112 about the Earth 116. For example, as shown in FIG. 1A, the SCATS instrument 104 may be in a Low Earth Orbit (LEO) 112. The SCATS instrument 104 may also be used at orbits other than LEO. For example, the SCATS instrument 104 may be placed and operated in a Geosynchronous Earth Orbit (GEO) 114, as shown in FIG. 1B, or a highly elliptical orbit, among others.

The SCATS instrument 104 has an instantaneous field of view 120 that is scanned within a scan plane 124. For example, the instantaneous field of view 120 of the SCATS instrument 104 in Low Earth Orbit can be 7°. A solar irradiance measurement is accomplished by slewing the field of view 120 of the SCATS instrument 104 to the Sun or solar disk 132. As the solar disk 132 comes within the instantaneous field of view 120 of the SCATS instrument 104, the scan rate is set to a first selected rate to optimize the time of the scan across the solar disk 132. More particularly, the scan rate is selected to optimize the signal to noise ratio for the solar and/or lunar irradiance measurement. The value obtained for the solar irradiance by scanning the instantaneous field of view 120 across the solar disk 132 is then recorded. The SCATS instrument is then slewed to view a desired footprint 128 of the Earth 116. The instantaneous field of view 120 is scanned across the Earth 116 at a second selected scan rate, and the radiance of the instantaneous field of view 120 within a desired footprint 128 of the Earth is obtained. In accordance with embodiments of the present invention, the scan rate at which the instantaneous field of view 120 is moved within the desired footprint 128 is selected to optimize the integration time of the radiance measurement within the desired footprint 128 of the Earth 116. The measurement of the Earth 116 radiance is then recorded.

In addition, the instantaneous field of view 120 of the SCATS instrument 104 can be slewed to take an irradiance measurement of the moon 136. The scan rate is optimized for the lunar irradiance measurement obtained by scanning the moon 136. The value of the moon 136 irradiance is recorded.

Figure 2:
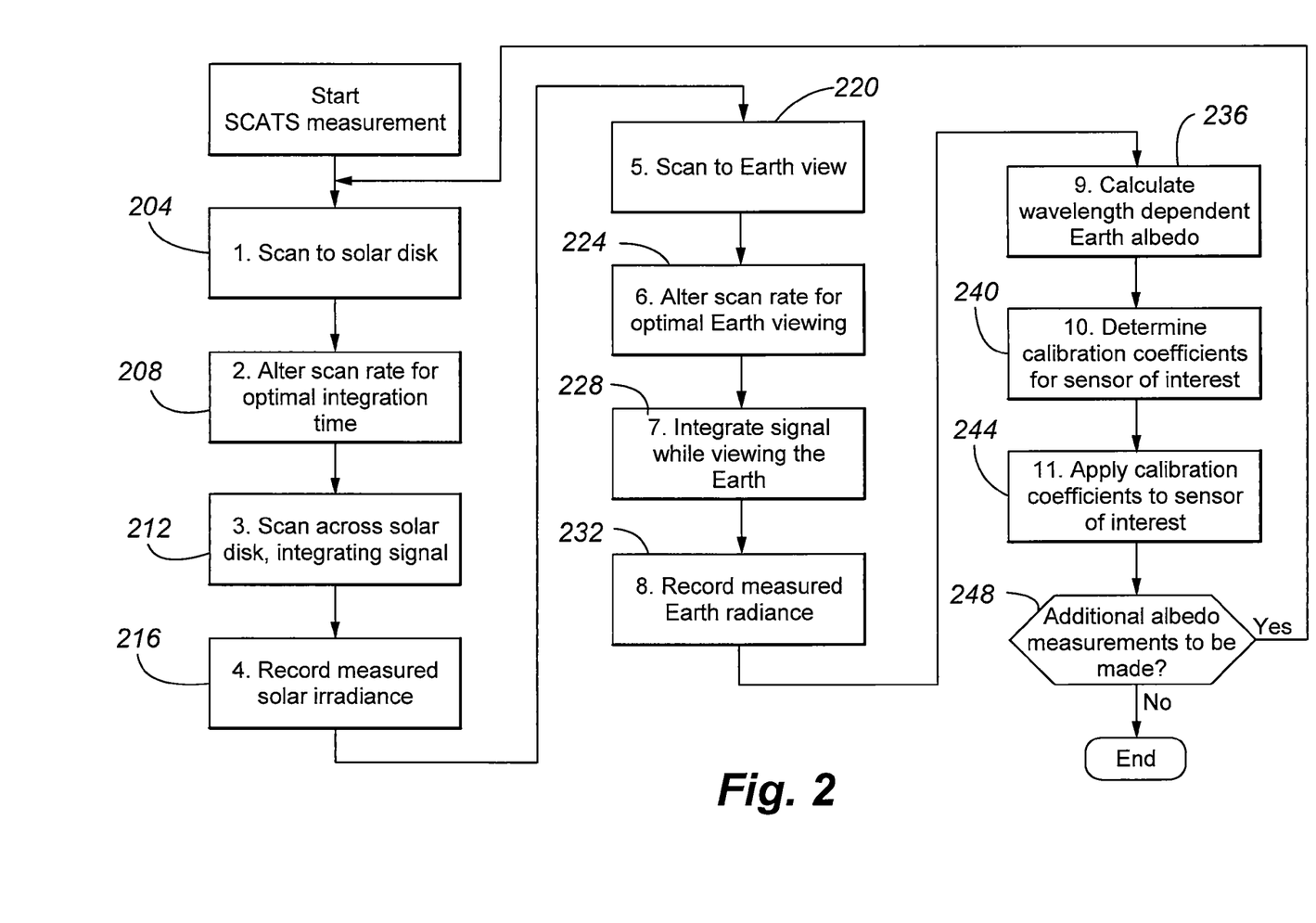
FIG. 2 is a flow-chart illustrating aspects of the operation of a SCATS instrument in accordance with embodiments of the present invention.

FIG. 2 shows the operational steps needed to measure the Earth's albedo and to calibrate another on orbit sensor. The first step after starting the SCATS measurement sequence is to scan the field of view 120 of the SCATS instrument 104 to the solar disk 132 (step 204). The scan rate is then altered to provide an optimal integration time (step 208). In particular, a scan rate is applied that optimizes the signal to noise ratio for the solar irradiance measurement. The field of view 120 of the SCATS instrument 104 is then scanned across the solar disk 132 at the selected scan rate, and the signal or measurement thus obtained is integrated (step 212). The integrated value that is the solar irradiance is then recorded (step 216). The measurement of the solar irradiance can be made for all wavelength channels of the SCATS instrument 104 simultaneously.

After measuring the solar irradiance, the field of view 120 of the SCATS instrument 104 is slewed to view a desired footprint 128 on the Earth 116 (step 220). The scan rate then applied is optimized for the Earth 116 radiance measurement (step 224). The Earth 116 radiance signal or measurement is thus integrated over a predetermined time to provide a measurement of the Earth radiance over the viewing footprint 128 (step 228). The measurement of the Earth radiance is recorded at step 232. The measurement of the Earth radiance may be taken for all of the wavelength channels of the SCATS instrument 104 simultaneously.

At step 236, the wavelength dependent Earth albedo is calculated. In particular, the albedo is equal to the measurement of the Earth radiance divided by the full, unocculted measurement of the Sun irradiance. Calibration coefficients for a specific instrument are calculated based upon the previously determined Earth albedo measurements (step 240). The measured calibration coefficients are then applied to the desired sensor data sets (step 244). If it is determined at step 248 that additional albedo measurements are to be made, the process may return to step 204. Otherwise, the process may end.

It is noted that the radiance and irradiance measurements are for all of the sensors (e.g., for all wavelength channels) of the SCATS instrument 104 simultaneously. Accordingly, the process calculates the wavelength dependent Earth albedo. Calibration coefficients for a specific instrument to be calibrated can be calculated by the SCATS instrument 104 based upon the Earth albedo measurements made by that instrument 104. Moreover, the application of the measured calibration coefficients is to the desired sensor data sets. The steps of measuring radiance and irradiance occur in a fraction of an orbital period. The steps of calculating albedo and calibration coefficients, and of applying those coefficients to data from the instrument being calibrated can be applied real time or in data post processing.

In accordance with further embodiments of the present invention, the albedo of the Earth 116 can be measured with reference to the lunar irradiance. In taking such a measurement, the field of view 120 of the SCATS instrument 104 is slewed to the lunar disk (i.e., to the Moon 136). The scan rate is then altered to provide an optimal integration time, such that the signal to noise ratio for the lunar irradiance measurement is optimized. The field of view 120 of the SCATS instrument 104 is scanned across the lunar disk 136 at the selected scan rate. The value of the lunar irradiance is then recorded. This measurement of the lunar irradiance can be made for all wavelength channels of the SCATS instrument simultaneously. The radiance of the Earth 116 is then obtained as discussed above. The wavelength dependent Earth albedo is then calculated by dividing the measurement of the Earth radiance by the integrated measurement of the Moon irradiance. The resulting calibration coefficients for a specific instrument can then be applied to the desired sensor data sets.

Figure 3:
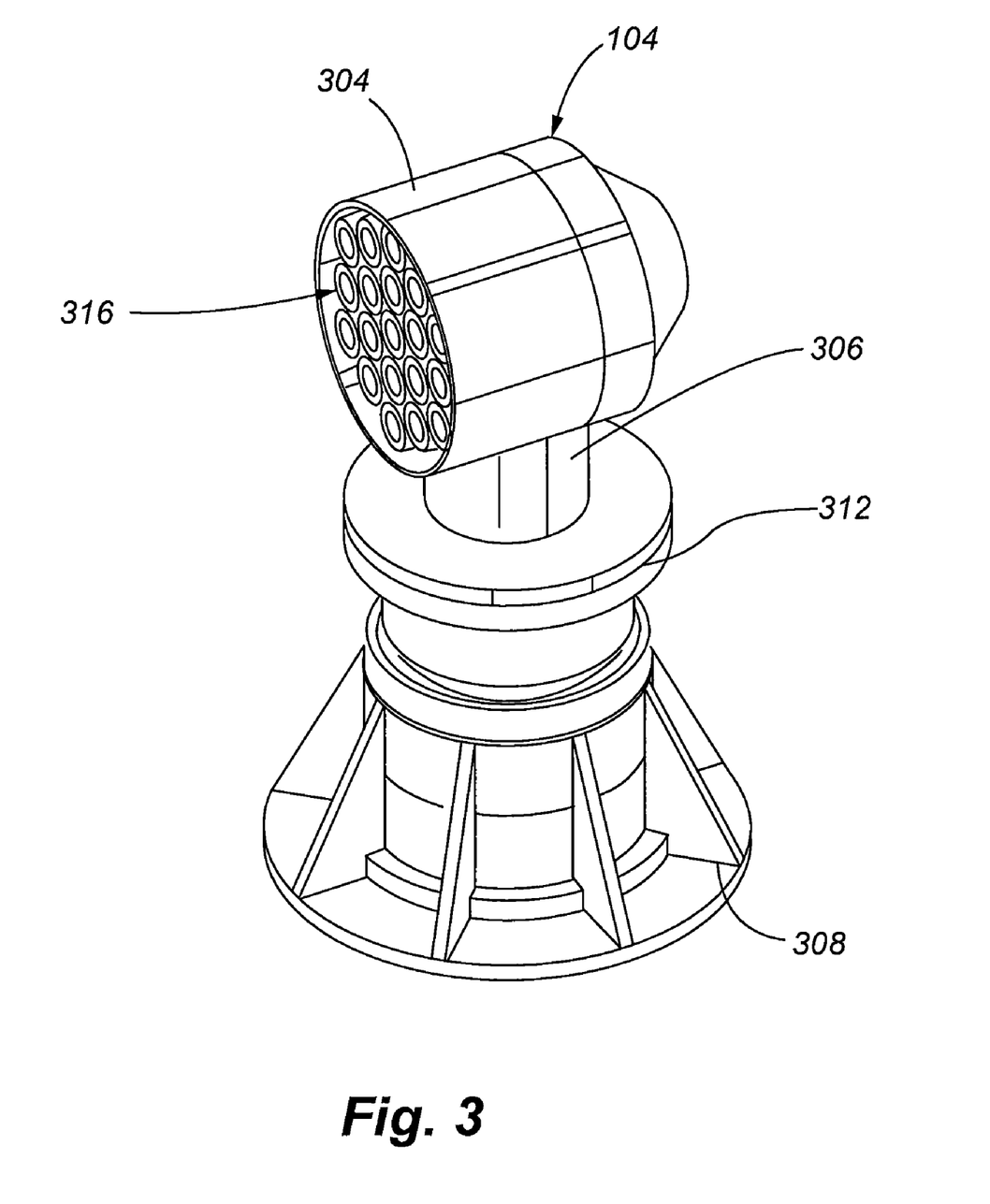
FIG. 3 is a perspective view of a SCATS instrument in accordance with embodiments of the present invention.

FIG. 3 is a depiction of a SCATS instrument 104 in accordance with embodiments of the present invention. In particular, the SCATS instrument 104 includes a scan or sensor head 304. The sensor head 304 is capable of rotating through 360°, for example to provide sequential views of the Sun 132, the Moon 136, and the Earth 116, as depicted in FIG. 1. The sensor head 304 mounts to a sensor head support tube 306 and to an azimuth drive shaft 312. The azimuth drive shaft 312 allows the sensor head 304 and the support tube 306 to rotate about a single axis with respect to the stationary support housing 308. The support housing 308 is mounted to a satellite 108 platform. Light from the Sun 132, Moon 136, or Earth 116 is collected by a plurality of sensors 316 included the sensor head 304.

Figure 4:
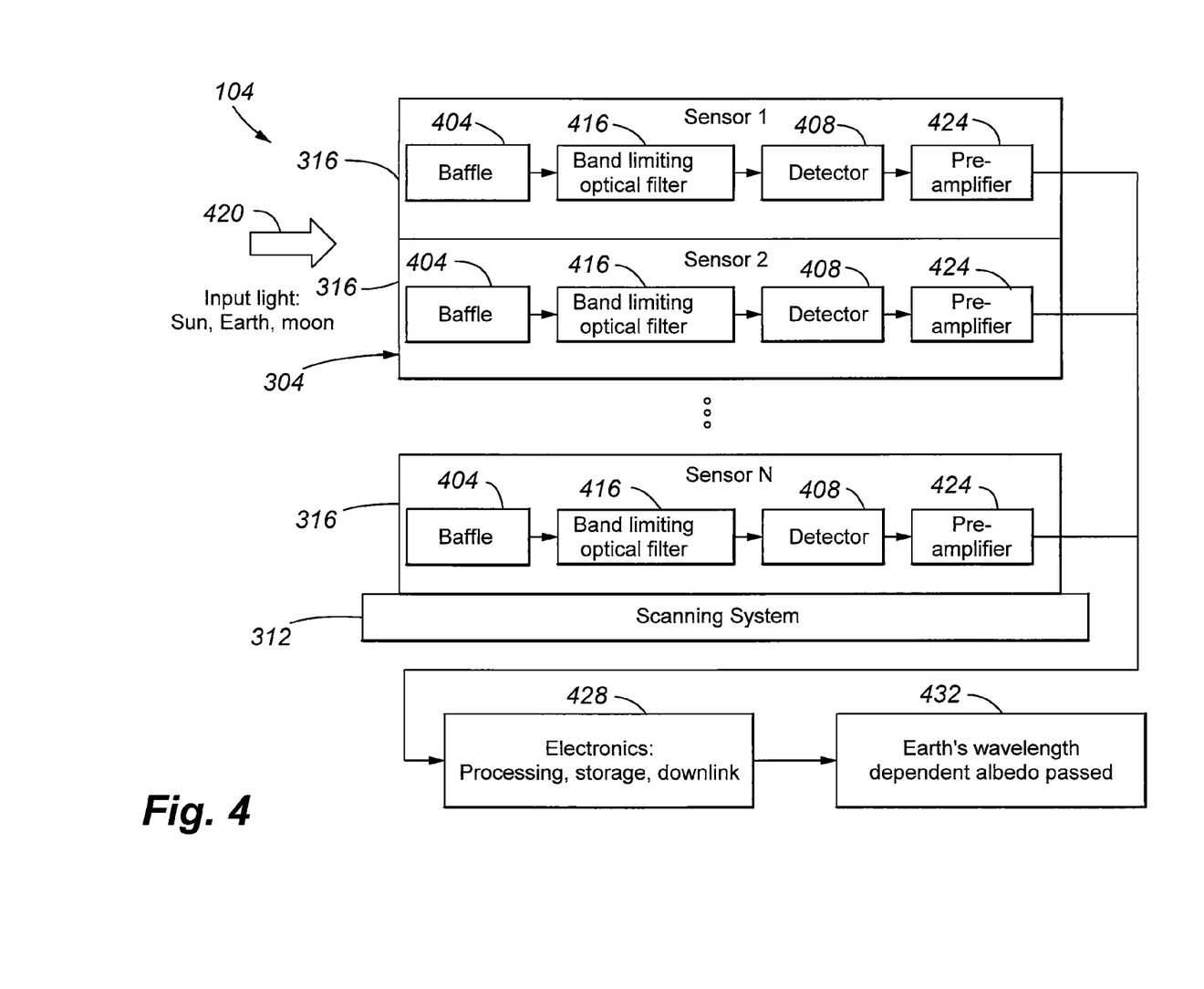
FIG. 4 is a block diagram depicting components of a SCATS instrument in accordance with embodiments of the present invention.

Components of an exemplary SCATS instrument 104 are depicted in block diagram form in FIG. 4. As shown in that figure, the sensor head 304 can include N sensors 316. Each sensor 316 includes a mechanical baffle 404 and a detector 408. The geometry of the baffle 404 and the area of the detector 408 define the étendue of the sensor 316. In accordance with embodiments of the present invention, the étendue may be the same for each of the sensors 316, such that the sensors 316 each encompass the same field of view 120. As an example, for a sensor 316 included in a SCATS instrument 104 for operation at a Low Earth Orbit, a field of view 120 of 7° is desirable. However, different field of view angles can be selected, for example in connection with operations of different altitudes, and/or to meet the demands of particular missions.

The sensors 316 may or may not be sensitive to different wavebands. The waveband of a sensor 316 is defined by a band limiting filter 416 and/or the detector 408 sensitivity. In general, light 416 within the field of view 120 of the SCATS instrument 104 passes through the baffle 404 of a sensor 316, is filtered by a band limiting optical filter 416 (if provided), and is received at the associated detector 408. In FIG. 4, the detectors 408 are of different types and/or are combined with different band limiting filters 416, in order to optimally sense different wavebands. Moreover, the different wavebands may be spaced at wavelength intervals extending from about 300 nm to the thermal infrared. The detectors 408 may comprise single element detectors. In accordance with further embodiments, at least one sensor 316 may comprise a hyperspectral instrument, and the detector 408 associated with that sensor 316 may comprise a multiple element detector 408. Moreover, a sensor 316 comprising a hyperspectral instrument can include a mechanical baffle 404 combined with an integrating sphere and a fiber optic element for passing collected light to a spectrometer. Any combination of detector 408 types may be used to populate the sensor head 304, as driven by specific mission requirements. Each sensor 316 may additionally include a preamplifier 424 to amplify the signal output by the associated detector 408.

The signal from each of the sensors 316 can be provided to supporting electronics 428. The supporting electronics 428 can include various components and/or functions. For example, the supporting electronics 428 can include one or more analog to digital converters, memory, and processors. These supporting electronics can additionally execute instructions or code to store the various integrated radiance and irradiance measurements and to calculate the albedo of the Earth and calibration coefficients for use by other instruments. The supporting electronics 428 can additionally include downlink or other transmission facilities, to communicate the data obtained and/or calculated by the SCATS instrument 104 to other instruments or facilities as output data 432.

Figure 5:
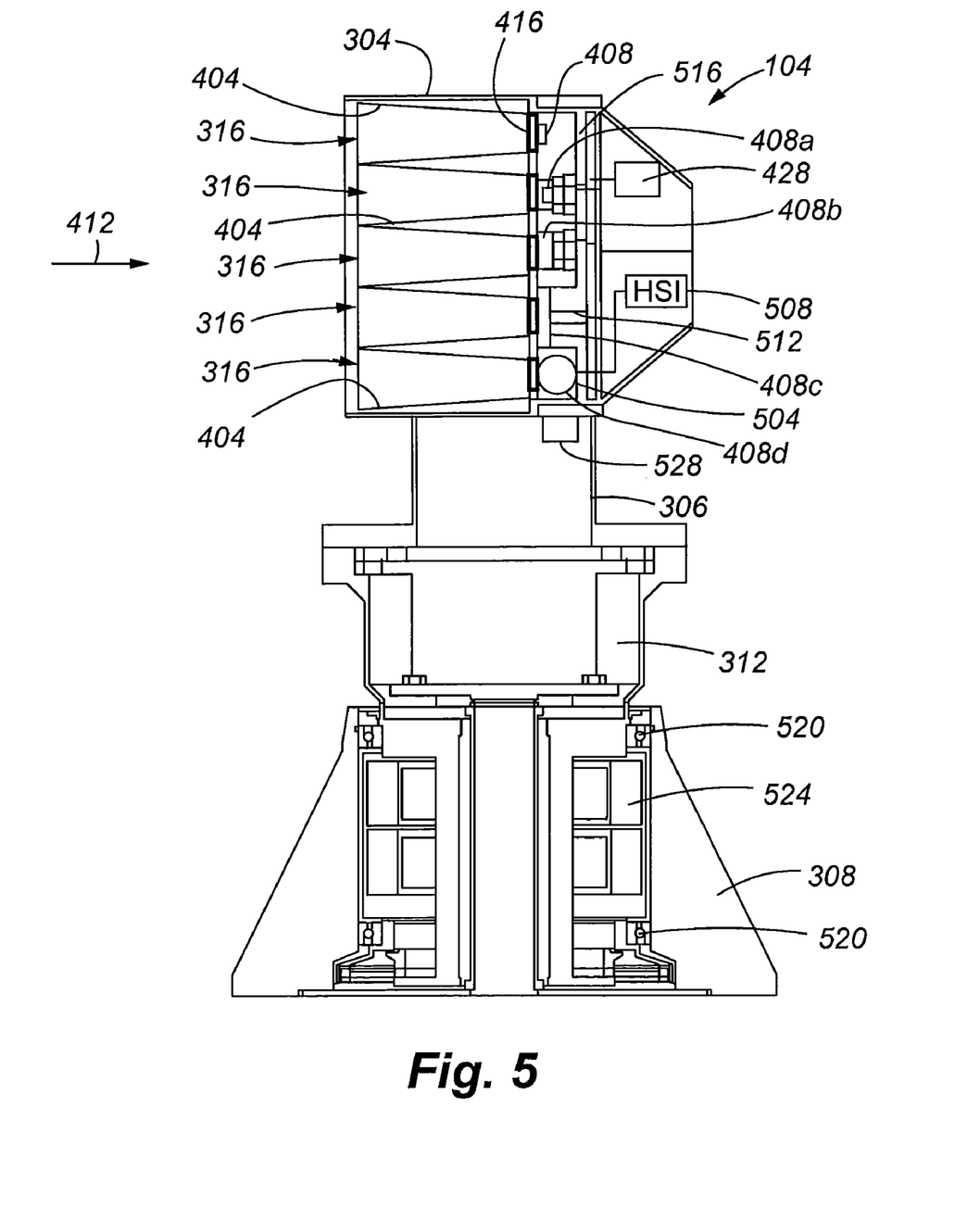
FIG. 5 is a cross-section of a SCATS instrument in accordance with embodiments of the present invention.

FIG. 5 illustrates an exemplary embodiment of a SCATS instrument 104 in accordance with embodiments of the present invention in cross-section. As shown, each of the mechanical baffles 404 may generally comprise a truncated cone. More particularly, the diameter of each of the baffles 404 generally decreases from a first, open end that receives incident light 420, to a second, narrower end adjacent the associated detector 408. A band limiting filter 416, if provided, is positioned such that light that passes through the baffle 404 impinges on the band limiting filter 416, such that filtered light is provided to the associated detector 408. The interior of the baffles 404 can each feature an internal structure and finish that is optimized for the operating wavelength band of the sensor 316. For example, for a sensor 316 operable in the solar reflective band, an associated baffle 404 can be optimized for stray light control. As another example, for a sensor 316 operable in the thermal infrared, the associated baffle 404 can be optimized to control emissivity. In accordance with embodiments of the present invention, the sensors 316 do not include diffusers or lenses.

FIG. 5 also depicts the inclusion of different detector 408 types in different sensors 316. As noted, different detector 408 types may be included for sensitivity to different wavebands. For example, a first detector 408a can comprise a silicon detector for sensitivity from the UV to the near IR wavelengths. A second detector 408b may comprise InGaAS detector for sensitivity to SW IR (short wave IR) wavelengths. A third detector 408c may comprise a thermopile or a comparable thermal detector for mid-wave and long-wave infrared wavelength detection. A fourth detector 408d may comprise a hyperspectral instrument or spectrograph that includes an integrating spherical collection chamber 504 connected to a hyperspectral instrument 508 by a fiber optic channel 512. In accordance with further embodiments, a fiber optic channel 512 can be eliminated, for example by mounting a hyperspectral instrument 508 directly to the end of the associated baffle 404 where space for collocating the hyperspectral instrument 508 and the mechanical baffle 404 of a sensor 316 comprising a hyperspectral instrument is available.

The sensor head 304 may additionally include an electronic circuit card 516. The electronic circuit card 516 may serve to interconnect the detectors to supporting electronics 428. Moreover, the detectors 408 and/or some or all of the supporting electronics 428 can be mounted to the electronic circuit card 516 directly. The electronic circuit card 516 can also provide interconnections to signal channels (e.g., wires) that pass between the electronic circuit card 516 and the sensor head 304, and external electronics, which can comprise some or all of the supporting electronics 428, provided as part of a satellite 108 to which the SCATS instrument 104 is mounted, or to another component of the SCATS instrument 104.

The azimuth drive shaft 312 is interconnected to the stationary support housing 308 by bearings 520. Accordingly, the azimuth drive shaft 312, the scan head support tube 306, and the scan head 304 can rotate through 360° with respect to the stationary support housing 308. The rotation, and thus the scan rate, of the scan head 304 can be controlled by a motor 524. The motor 524 may be operated by one or more controllers provided as part of the support electronics 428. Alternatively or in addition, the field of view 120 of the SCATS instrument 104 can be scanned within the scan plane 124 using orthogonal scanning mirrors for the cancellation of polarization effects. In accordance with further embodiments, the SCATS instrument 104 can include a thermoelectric cooler with a proportional integral derivative (PID) controller 528 to maintain the detectors 316 at a constant temperature.

In the following it is demonstrated how traceability to SI units is achieved, and why a SCATS instrument 104 in accordance with embodiments of the present invention can attain an uncertainty that is sufficiently small for climate trending. Herein, the role of albedo will become apparent. The variables discussed are:

$E_{\lambda S}$=Solar Spectral Irradiance (Watt/m$^2$-μm),
$L_{\lambda E}$=Earth Spectral Radiance (Watt/m$^2$-sr-μm),
A=Detector area (m$^2$),
B=Optical bandwidth (μm),
S=Baffle solid angle (sr),
$G_S$=End-to-end gain (DN/Watt),
$DN_s$=Output signal scanning the Sun (DN),
$DN_E$=Output signal scanning the Earth (DN),
$K_R$=Radiance calibration factor (Watt/m$^2$-sr-μm)/DN
$K_1$=Irradiance calibration factor (Watt/m$^2$-μm)/DN
$\alpha_E$=Earth Albedo (unitless), Ground calibration of the SCATS instrument 104, for example at the NIST SIRCUS facility, will determine the SCATS instrument 104 calibration factors, $K_R$ and $K_1$, to a few tenths of a percent; $K_R$, and $K_1$ are consequently traceable to the SI units. $K_R$ and $K_1$ depend on the detector 408 area, the optical filter 416 bandwidth, baffle 404 solid angle, and end-to-end gain. The detector 408 area and baffle 404 solid angle are geometrically determined and invariant. Ion assist deposited thin film filters or other comparable fabrication processes have demonstrated center wavelength and bandwidth stability appropriate for this application. The end-to-end gain comprises the detector 408 quantum efficiency, filter 416 transmission, integration time, pre-amplifier 424 gain, signal chain gain, and analog to digital conversion. It is not unexpected that the end-to-end gain could change a few percent in going from calibration to on-orbit operation; this level of change is insufficient to support climate trending. The ratio of $K_R$ to $K_1$ however, is an invariant geometrical factor with units of sr$^{-1}$. Said ratio carries the traceability to SI units with an uncertainty of a few tenths of a percent.

Measurements of the Earth radiance and solar irradiance are reported in digital numbers as $DN_E$ and $DN_S$ respectively. Using the calibration factors the physical units of radiance and irradiance are recovered:

$L_{\lambda E}=K_E DN_E$, and $E_{\lambda S}=K_1 DN_S$.

The Earth albedo follows:

$$\alpha_E = \frac{L_{\lambda E}}{E_{\lambda S}} = \frac{K_R}{K_I}\frac{DN_E}{DN_S};$$

this has units of sr$^{-1}$. The SI traceable ratio $K_R$ to $K_1$ is the sole conversion factor that is needed. The Earth albedo for an observed scene as measured and calculated above is passed onto other sensors or instruments and used in their calibration.

An analogous line of reasoning can be applied to the lunar irradiance. Since the measurements of the Sun and Moon are irradiances the albedo as calculated will be unitless. In this manner, the Moon can be used as an on-orbit radiometric reference without the difficulties associated with the high signal levels of solar viewing.

This calibration methodology is limited by the stability of the residual nonlinearity over the dynamic range of the end-to-end gain $G_S$. The signal dynamic range is 6 orders of magnitude. Using highly linear detectors and electronics and checking the signal chain non-linearity assures the residual uncertainty is small. On-orbit nonlinearity tests such as dark current integration, varying signal levels from progressive Moon phases, and injecting of stable digital-to-analog signals into the electronics chain can help maintain the SI unit traceable calibration.

The SCATS instrument 104 in accordance with embodiments of the present invention ties on-orbit measurements of a celestial body's upwelling radiances and measurements of lunar irradiances to corresponding solar irradiances. High absolute accuracy is achieved and maintained by having a signal dynamic range that allows viewing the solar disk and the Earth (or Moon) with the same optical train; that is, no means of scattering or attenuation is needed to secure these two measurements. The SCATS detectors 408 and electronics 428 require stable linearity over a large dynamic range for signals from the Sun, Earth, and Moon. The worst case dynamic range is roughly 10$^6$ in the visible band and 10$^4$ in the thermal infrared. The detector and electronics need to maintain high gain and offset stability. The solar (or Moon) and Earth measurements occur minutes apart, guaranteeing negligible electronics drift between measurements. This accurate, high temporal stability albedo measurement is SI traceable to national standards laboratories such as NIST through pre-flight calibrations of SCATS' radiance and irradiance.

In accordance with at least some embodiments of the present invention, the sensors 316 of the SCATS instrument 104 are sensitive to spaced apart, non-overlapping wavebands having a dominant center wavelength. The operable wavebands may be selected in view of the other instruments that will be provided with calibration information from the SCATS instrument 104. Where the SCATS instrument 104 includes a sensor 316 comprising a hyperspectral instrument, the accuracy of the signal obtained by that instrument can be increased by making reference to the center wavelengths of the other sensors 316. In particular, the absolute level of the waveform from the hyperspectral instrument can be set with reference to the signals from the other sensors 316, and the waveform from the hyperspectral instrument can be used to provide an indication of the strength of received light at wavelengths between the center wavelength of the other sensors.

In accordance with embodiments of the present invention, calibration information from the SCATS instrument 104 is provided to other instruments, or is applied to data from such other instruments, to allow data collected by those other instruments to be calibrated. In order to provide appropriate calibration information, the footprint 128 that is scanned by the SCATS instrument 104 can be selected to coincide to the sensor footprint of an instrument being provided with calibration information. In addition, the calibration information provided by the SCATS instrument 104 is generally aligned in time with the data to which the calibration information is to be applied, to provide simultaneity in space and time and uniformity in scene.

In accordance with embodiments of the present invention, the instrument for which calibration information is being supplied can be mounted to the same satellite 108 to which the SCATS instrument 104 is mounted. Alternatively or in addition, the SCATS instrument 104 can be part of a satellite 108 that is included in a constellation of satellites with one or more instruments or other satellites. In accordance with further embodiments of the present invention, calibration information from the SCATS instrument 104 can be used to calibrate data from instruments or other satellites when the satellites' experience a simultaneous nadir overpass.

Whether calibration information based on a ratio of the Earth's radiance to the Sun's irradiance, or based on the ratio of the Earth's radiance to the Moon's irradiance is used can be selected based on the instrument to which the calibration information will be applied. Accordingly, a SCATS instrument 104 in accordance with embodiments of the present invention can provide useful calibration information for a wide range of other instruments.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for providing calibration information, comprising:
    scanning a field of view of an instrument in orbit around the Earth over at least one of the solar disk and the lunar disk, wherein the instrument includes at least one sensor;
    measuring an irradiance signal obtained by scanning the field of view of the instrument over at least one of the solar disk and the lunar disk;
    slewing the field of view of the instrument to the Earth;
    scanning the field of view of the instrument over a selected area of the Earth;
    measuring a radiance signal obtained by scanning the field of view of the instrument over the selected area of the Earth;
    obtaining a calibration coefficient by calculating a ratio of an integrated signal obtained by scanning the field of view of the instrument over the selected area of the Earth to an integrated signal obtained by scanning the field of view of the instrument over the at least one of the solar disk and the lunar disk.

2. The method of claim 1, further comprising:
    scanning the field of view of the instrument over the solar disk at a first scan rate;
    storing the irradiance signal obtained by scanning the field of view of the instrument over the solar disk;
    scanning the field of view of the instrument over the selected area of the Earth at a second scan rate, wherein obtaining a calibration coefficient includes calculating a ratio of the radiance signal obtained by scanning the field of view of the instrument over the selected area of the Earth to the irradiance signal obtained by scanning the field of view of the instrument over the solar disk.

3. The method of claim 1, further comprising:
    scanning the field of view of the instrument over the solar disk at a first scan rate;
    storing the irradiance signal obtained by scanning the field of view of the instrument over the solar disk;
    scanning the field of view of the instrument over the lunar disk at a second scan rate;
    storing the irradiance signal obtained by scanning the field of view of the instrument over the lunar disk;
    scanning the field of view of the instrument over the selected area of the Earth at a third scan rate,
    wherein obtaining a calibration coefficient includes:
        calculating a ratio of the radiance signal obtained by scanning the field of view of the instrument over the selected area of the Earth to the irradiance signal obtained by scanning the field of view of the instrument over the solar disk to obtain a first calibration coefficient, and
        calculating a ratio of the radiance signal obtained by scanning the field of view of the instrument over the selected area of the Earth to the irradiance signal obtained by scanning the field of view of the instrument over the lunar disk to obtain a second calibration coefficient.

4. The method of claim 1, wherein scanning the field of view of the instrument includes rotating a sensor head of the instrument to scan the field of view of the sensor within a scan plane.

5. The method of claim 4, wherein the sensor head of the instrument includes a plurality of sensors.

6. The method of claim 5, wherein the plurality of sensors are sensitive to different optical wavelengths.

7. The method of claim 5, wherein each of the plurality of sensors provides a linear output over an operative dynamic range of the sensor.

* * * * *